(12) United States Patent
Lee et al.

(10) Patent No.: US 6,650,536 B2
(45) Date of Patent: Nov. 18, 2003

(54) COOLING SYSTEM FOR COMPUTER

(75) Inventors: Tsung Lung Lee, Taipei (TW); Chung Tien Lai, Taipei (TW); Shuai Jiang, Shenzhen (CN)

(73) Assignee: Foxconn Precision Components Co., Ltd., Taipei Hsien (TW)

( * ) Notice: Subject to any disclaimer, the term of this patent is extended or adjusted under 35 U.S.C. 154(b) by 147 days.

(21) Appl. No.: 09/841,612

(22) Filed: Apr. 24, 2001

(65) Prior Publication Data

US 2002/0149910 A1 Oct. 17, 2002

(51) Int. Cl.[7] .................................................. H05K 7/20
(52) U.S. Cl. .................. 361/687; 361/695; 165/104.21; 454/184
(58) Field of Search ............................... 361/683–687, 361/688–695, 704–707, 715, 717–724; 174/15.2, 16.1, 16.3; 257/706–727; 62/3.2, 3.7, 259.2, 332, 440, 429, 3.62, 457.1, 457.2, 457.9, 404, 419; 165/104.21–104.27, 104.32–104.34; 454/184

(56) References Cited

U.S. PATENT DOCUMENTS 5,931,002 A * 8/1999 Nagashima .................... 62/3.7
5,946,188 A * 8/1999 Rochel et al. ............... 361/690
6,038,128 A * 3/2000 Hood et al. .................. 361/687
6,113,485 A * 9/2000 Marquis et al. ............. 454/184
6,125,924 A * 10/2000 Lin ............................. 165/122
6,196,003 B1 * 3/2001 Macias et al. ................ 62/3.7
6,215,660 B1 * 4/2001 Lin ............................. 361/695

FOREIGN PATENT DOCUMENTS

WO          WO 01/69694 A1 * 3/2000    ........... H01L/35/00

* cited by examiner

*Primary Examiner*—Michael Datskovsky
(74) *Attorney, Agent, or Firm*—Wei Te Chung

(57) ABSTRACT

A cooling system for a computer (10) includes a thermoelectric cooler (20) attached to a side panel (14) of the computer, an internal heat sink (30) attached on an electrical component, a cooling fan (52) attached on one side of the internal heat sink, a fan duct (50) connected between the thermoelectric cooler and the cooling fan, an exhaust fan (80), and an external heat sink (70) attached on the side panel opposite to the thermoelectric cooler. When electrified, the thermoelectric cooler is polarized to generate a hot surface in contact with the side panel and a cold surface facing toward an interior of the computer. The cooling fan sucks cold air from around the cold surface, and blows the cold air through and over the internal heat sink. The air is then expelled from the computer by the exhaust fan, and directed toward the external heat sink.

19 Claims, 4 Drawing Sheets

COOLING SYSTEM FOR COMPUTER

BACKGROUND OF THE INVENTION

1. Field of the Invention

The present invention relates to a cooling system, and particularly to a cooling system for a computer and heat-generating components of a computer.

2. Description of Related Art

Many computer electronic devices such as central processing units (CPUs) generate a lot of heat during normal operation. This can deteriorate their operational stability and damage associated electronic equipment. Thus the heat must be removed efficiently to ensure normal operation. Conventionally, a heat sink is attached to a top surface of a CPU to remove heat therefrom. A fan is often attached on a top of the heat sink, to facilitate cooling of the CPU. An exhaust fan is often attached on a rear panel of a computer to expel hot air from the computer.

Contemporary powerful CPUs generate unprecedented amounts of heat. Nevertheless, the operating temperatures of such CPUs must still be kept within conventional ranges. The above-mentioned conventional heat sink systems are increasingly unable to meet the demanding heat-removal requirements of contemporary CPUs. Furthermore, conventional heat sink systems generally only address heat removal for a single electrical component, rather than heat removal for the computer system as a whole. The industry trend toward miniaturization of computers is making heat removal for computer systems as a whole more and more critical.

A cooling system which overcomes the above-mentioned problems and shortcomings is desired.

SUMMARY OF THE INVENTION

Accordingly, an object of the present invention is to provide a cooling system which can cool electrical components efficiently.

Another object of the present invention is to provide a cooling system which can cool an entire computer system.

In order to achieve the above-mentioned objects, a cooling system of the present invention comprises a thermoelectric cooler, an internal heat sink, a cooling fan, a fan duct, an exhaust fan and an external heat sink. The thermoelectric cooler is attached at an inside surface of a side panel of a computer. The thermoelectric cooler can be polarized to generate a hot surface and a cold surface when it is electrified. The hot surface contacts the side panel, and the cold surface faces toward an interior of the computer. The internal heat sink is attached on an electrical component, for removing heat therefrom. The thermoelectric cooler is separated from the electrical component by a partition plate, to prevent cold air generated around the cold surface of the thermoelectric cooler from being randomly mixed with hot air generated around the electrical component. The cooling fan is attached on one side of the heat sink. The fan duct is connected between the thermoelectric cooler and the cooling fan. The exhaust fan is attached on the side panel of the computer. The external heat sink is attached on an outside surface of the side panel, opposite to the hot surface of the thermoelectric cooler. Alternatively, instead of having a fan duct, an aspirate fan is used to blow outside air toward the thermoelectric cooler.

When the thermoelectric cooler is electrified, the cooling fan sucks the cold air from around the cold surface of the thermoelectric cooler, and blows the cold air through and over the internal heat sink. The air is then expelled from the computer by the exhaust fan, and directed toward the external heat sink. Thus both the electrical component and the computer are cooled efficiently.

Other objects, advantages and novel features of the invention will become more apparent from the following detailed description of the preferred embodiment when taken in conjunction with the accompanying drawings.

DETAILED DESCRIPTION OF THE PREFERRED EMBODIMENTS

Figure 1:
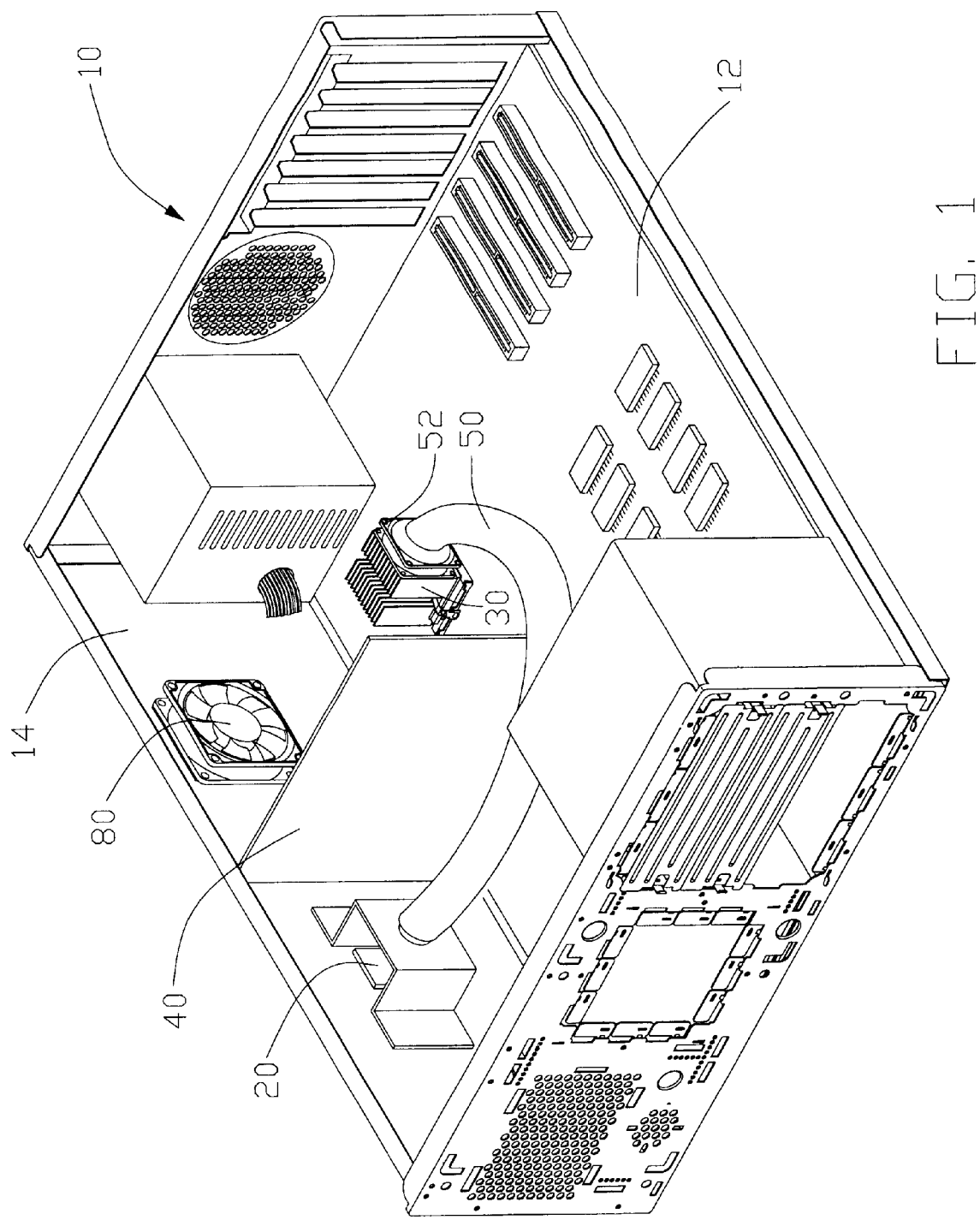
FIG. 1 is a perspective view of a cooling system constructed in accordance with a preferred embodiment of the present invention, together with other components of a computer.

Reference will now be made to the drawing figures to describe the preferred embodiments of the present invention in detail.

FIG. 1 shows a cooling system of the present invention, together with other components of a computer 10. The computer 10 comprises a motherboard 12, a side panel 14 and a partition plate 40. A central processing unit (CPU) (not visible in FIG. 1) is attached on the motherboard 12. An internal heat sink 30 is attached on the CPU. A cooling fan 52 is attached on one side of the internal heat sink 30. A rectangular opening 16 is defined in the side panel 14, such that the opening 16 generally opposes the cooling fan 52 (see FIG. 2). A pivotable door 18 is pivotally attached to an edge of the side panel 14 adjacent the opening 16 (see FIG. 2). The door 18 is connected to and actuated by a power circuit (not shown) of the computer 10.

The cooling system comprises a thermoelectric cooler 20, a fan duct 50, and an exhaust fan 80. The thermoelectric cooler 20 is attached on an inside surface of the side panel 14 of the computer 10. The thermoelectric cooler 20 is electrically connected to a direct power source, and can be polarized to generate a hot surface and a cold surface when it is electrified. The hot surface contacts the side panel 14 and the cold surface faces an interior of the computer 10. The thermoelectric cooler 20 is separated from the CPU by the partition plate 40, to prevent cold air generated around the cold surface of the thermoelectric cooler from randomly mixing with hot air generated around the CPU and other electrical components within the computer 10. A suitable thermoelectric cooler 20 is made by the KeyoTech company in the U.S.A. The fan duct 50 is connected between the thermoelectric cooler 20 and the internal heat sink 30. One end of the fan duct 50 is fixed on the side panel 14, with an intake of the fan duct 50 opposite to the thermoelectric cooler 20. An opposite end of the fan duct 50 is fixed on the cooling fan 52. The exhaust fan 80 is attached to the inside surface of the side panel 14, in communication with the opening 16 and generally opposite to the cooling fan 52.

Figure 2:
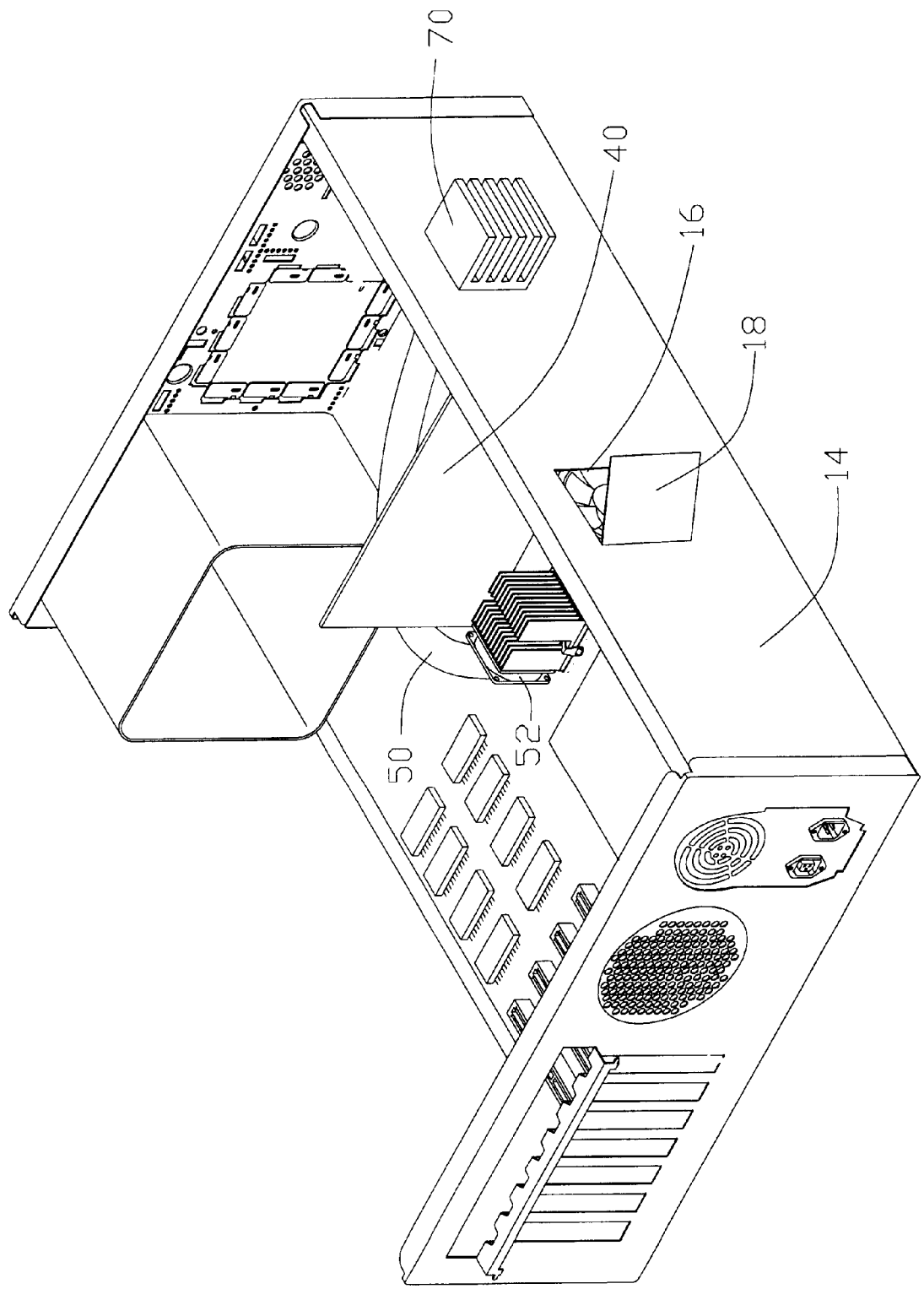
FIG. 2 is similar to FIG. 1, but viewed from another aspect.

Referring particularly to FIG. 2, an external heat sink 70 is attached to an outside surface of the side panel 14, generally opposite to the thermoelectric cooler 20. The external heat sink 70 functions to dissipate heat from the side panel 14 which is received from the hot surface of the thermoelectric cooler 20.

Figure 3:
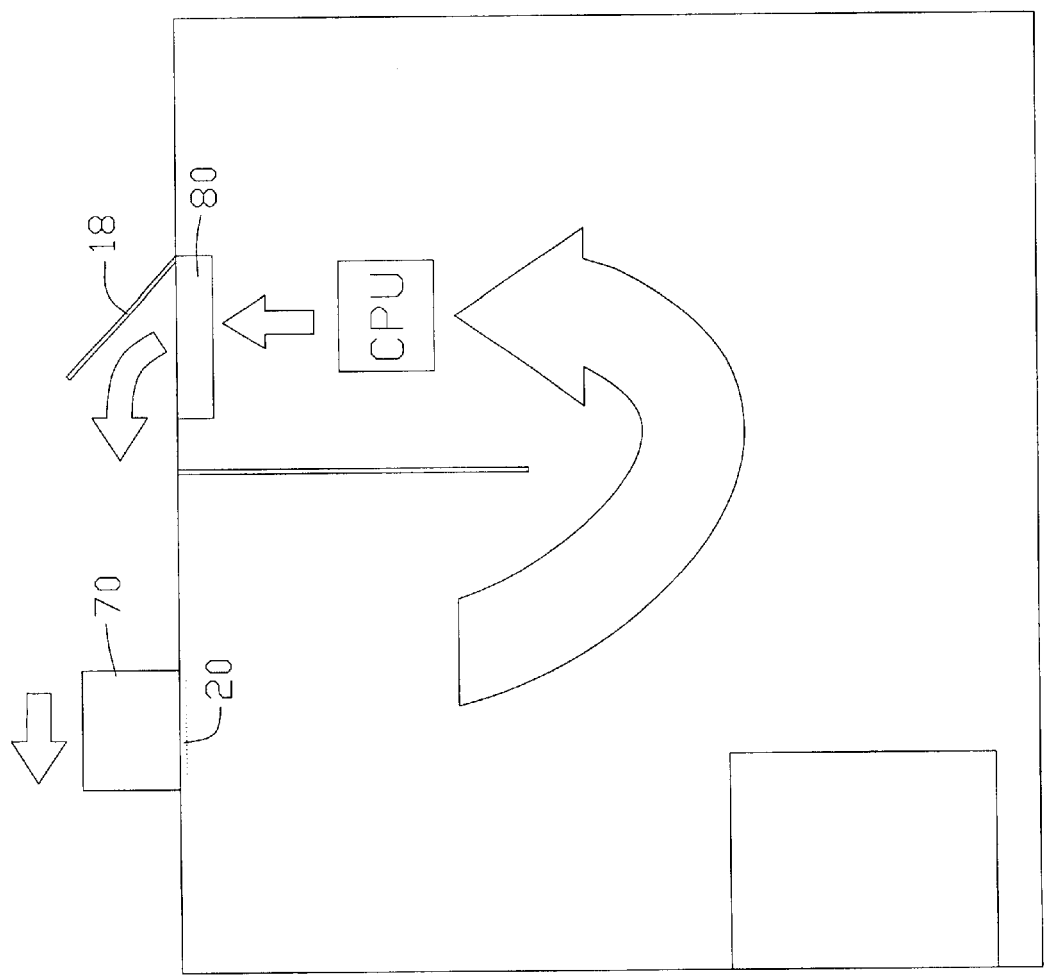
FIG. 3 is a schematic drawing showing air flow of the cooling system of the present invention.

Referring also to FIG. 3, when power (not shown) of the computer 10 is turned on, the thermoelectric cooler 20 is polarized to generate the cold surface and the hot surface. Simultaneously, the door 18 is rotated an acute angle from a position covering the opening 16 to an open position. The cooling fan 52 sucks air through the fan duct 50, and the cold air generated around the cold surface of the thermoelectric cooler 20 is thereby blown through and over the internal heat sink 30. Such air flow is then expelled from the computer 10 by the exhaust fan 80. Thus the internal heat sink 30 removes heat from the CPU efficiently. Moreover, the door 18 directs the air flow toward the external heat sink 70. The external heat sink 70 therefore efficiently dissipates heat from the side panel 14.

When the power (not shown) of the computer 10 is turned off, the thermoelectric cooler 20 is depolarized. Simultaneously, the door 18 is rotated back to its original position covering the opening 16 of the side panel 14.

Figure 4:
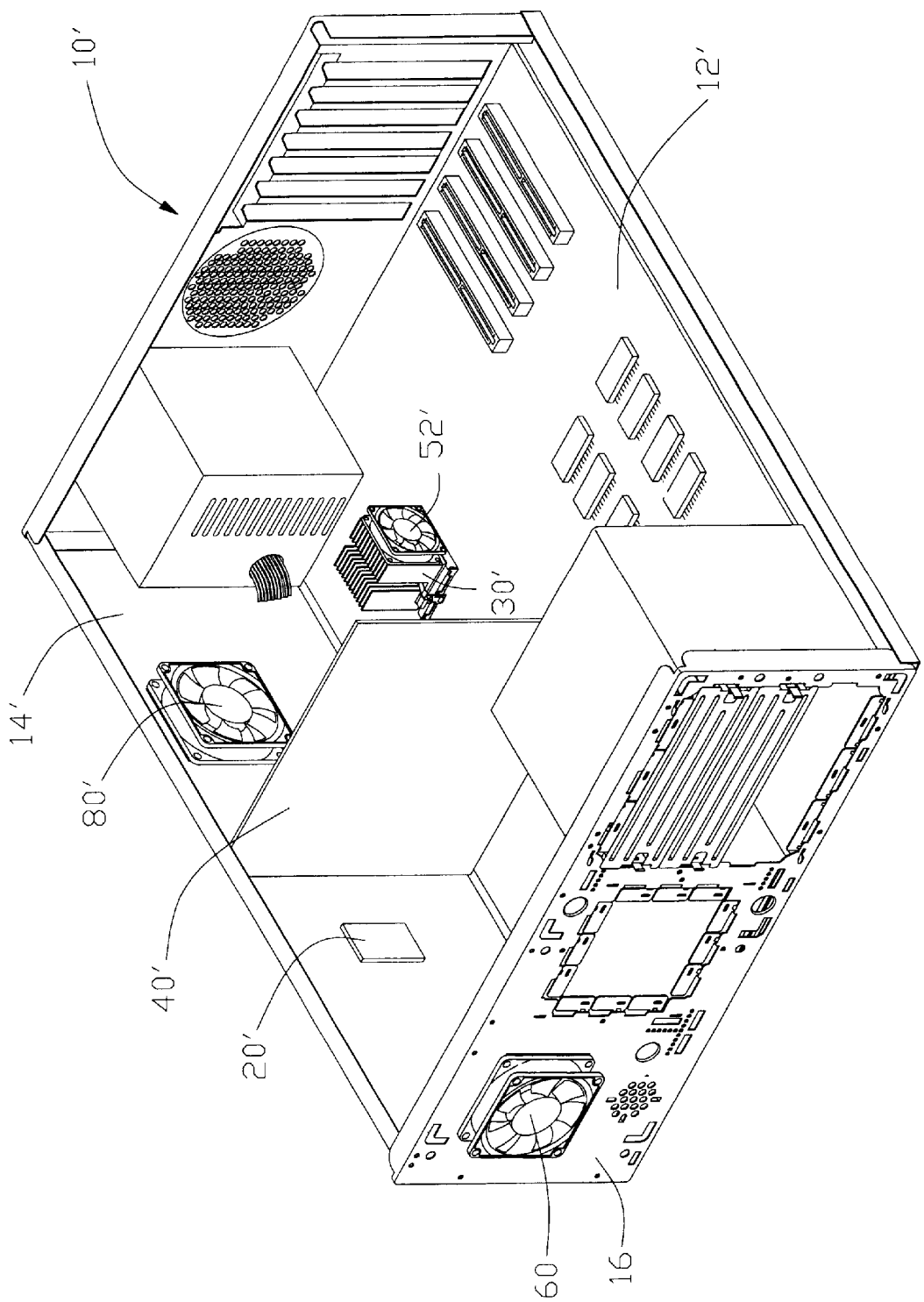
FIG. 4 is a perspective view a cooling system constructed in accordance with an alternative embodiment of the present invention, together with other components of a computer.

FIG. 4 shows a cooling system constructed in accordance with an alternative embodiment of the present invention, together with other components of a computer 10'. The computer 10' is similar to the computer 10 and comprises a motherboard 12', a side panel 14', a front panel 16', and a partition plate 40'. An internal heat sink 30' is attached on a CPU (not visible in FIG. 4) which is mounted on the motherboard 12'. A pivotable door 18' (not visible in FIG. 4) pivotally extends from the side panel 14 adjacent an opening 16' (not visible in FIG. 4). The cooling system comprises a thermoelectric cooler 20', an aspirate fan 60, a cooling fan 52' and an exhaust fan 80'.

When power (not shown) of the computer 10' is turned on, the thermoelectric cooler 20' is polarized to generate the cold surface and the hot surface. Simultaneously, the door 18' (not visible in FIG. 4) is rotated an acute angle from a position covering the opening 16' (not visible in FIG. 4) to an open position. The aspirate fan 60 blows outside air toward the thermoelectric cooler 20'. The air around the thermoelectric cooler 20' is cooled down by the cold surface of thermoelectric cooler 20'. The cooling fan 52' sucks most of the cold air from around the cold surface of the thermoelectric cooler 20' and blows it through and over the internal heat sink 30'. Remaining cold air around the cold surface of the thermoelectric cooler 20' is blown to other components within the computer 10'. The whole cooling air flow is then expelled from the computer 10' by the exhaust fan 80'. Thus the CPU and other components within the computer 10' are cooled down efficiently. Moreover, the door 18' directs the air flow toward an external heat sink 70' (not visible in FIG. 4). The external heat sink 70' therefore efficiently dissipates heat from the side panel 14.

In the present invention, the thermoelectric cooler 20, 20' can generate air within the computer 10, 10' which is much colder than ambient temperature air. This enables superior heat dissipation compared to related art systems which utilize only ambient temperature air. Furthermore, the thermoelectric cooler 20, 20' operates in cooperation with the cooling fan 52, 52', the internal heat sink 30, 30', the exhaust fan 80, 80', and the fan duct 50 or the aspirate fan 60. This cooperative operation provides enhanced removal of heat from the CPU. The door 18, 18' and the external heat sink 70, 70' further operate to dissipate heat from the side panel 14. Thus the CPU and the computer 10, 10' are maintained at optimally safe operating temperatures.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cooling system for a computer, comprising:
   a thermoelectric cooler attached on an inside of a panel of the computer and electrically connected with a power source, wherein when the thermoelectric cooler is electrified the thermoelectric cooler is polarized to generate a hot surface contacting the panel and a cold surface;
   a heat sink attached on an electrical component for removing heat therefrom; and
   blowing means for blowing cold air generated around the cold surface of the thermoelectric cooler over the heat sink and thereby cooling the electrical component.

2. The cooling system as claimed in claim 1, wherein the blowing means comprises a cooling fan attached on one side of the heat sink and a fan duct between the thermoelectric cooler and the cooling fan.

3. The cooling system as claimed in claim 1, wherein the thermoelectric cooler is separated from the electrical component by a partition.

4. The cooling system as claimed in claim 1, wherein an external heat sink is attached on an outside of the panel of the computer generally opposite to the thermoelectric cooler, for removing heat from the panel.

5. The cooling system as claimed in claim 1, wherein an exhaust fan is attached on a panel of the computer, to expel air from the computer.

6. The cooling system as claimed in claim 1, wherein the blowing means comprises a cooling fan attached on one side of the heat sink and an aspirate fan for aspirating outside air toward the thermoelectric cooler.

7. A computer system comprising:
   a computer comprising a motherboard on which electrical components are mounted, and at least one panel; and
   a cooling system comprising:
      a thermoelectric cooler, wherein when the thermoelectric cooler is electrified the thermoelectric cooler is polarized to generate a hot surface and a cold surface;
      an internal heat sink attached on one of the electrical components;
      blowing means for blowing cold air generated around the cold surface of the thermoelectric cooler over the internal heat sink and thereby cooling the electrical component;
      an exhaust fan attached on the at least one panel for expelling air from the computer; and
      an external heat sink attached on the at least one panel generally opposite to the thermoelectric cooler for dissipating heat from such panel.

8. The computer system as claimed in claim 7, wherein the computer further comprises a partition separating the thermoelectric cooler from the electrical components, to prevent cold air generated around the cold surface of the thermoelectric cooler from being randomly mixed with hot air generated around the electrical components.

9. The computer system as claimed in claim 7, wherein the blowing means comprises a cooling fan attached to one side of the heat sink and a fan duct between the thermoelectric cooler and the cooling fan.

10. The cooling system as claimed in claim 9, wherein one end of the fan duct is fixed at the at least one panel with an intake thereof generally opposite the thermoelectric cooler, and another end of the fan duct is fixed to the cooling fan.

11. The computer system as claimed in claim 7, wherein the thermoelectric cooler is attached on the at least one panel, and the hot surface contacts such panel.

12. The computer system as claimed in claim 7, wherein the at least one panel having the exhaust fan attached thereto defines an opening therein in communication with the exhaust fan.

13. The computer system as claimed in claim 12, wherein a pivotable door is pivotally attached to an edge of the at least one panel having the exhaust fan attached thereto, the door being attached adjacent the opening.

14. The computer system as claimed in claim 13, wherein when the thermoelectric cooler is electrified the door rotates to an open position, and when the thermoelectric cooler is de-electrified the door rotates back to cover the opening.

15. The computer system as claimed in claim 7, wherein the blowing means comprises a cooling fan attached to one side of the heat sink and an aspirate fan for aspirating outside air toward the thermoelectric cooler.

16. The computer system as claimed in claim 15, wherein the aspirate fan is fixed in a front panel of the computer.

17. A cooling system for a computer which has a panel, comprising:
    an exhaust fan mounted on the panel;
    an thermoelectric cooler attached to an inside of the panel;
    a partition located between the exhaust fan and the thermoelectric cooler;
    a heat sink attached to an outside of the panel and located proximate to the thermoelectric cooler;
    a door attached to an edge of the panel adjacent the exhaust fan;
    wherein when the exhaust fan operates and the thermoelectric cooler is electrified, air flow is generated from a cold surface of the thermoelectric cooler to at least one electrical component in the computer, the exhaust fan, the door and the heat sink whereby heat absorbed by the heat sink from a hot surface of the thermoelectric cooler is dissipated into an external environment surrounding the computer.

18. A computer system comprising:
    a computer comprising a motherboard on which electrical components are mounted, and at least one panel; and
    a cooling system comprising:
        a thermoelectric cooler, wherein when the thermoelectric cooler is electrified the thermoelectric cooler is polarized to generate a hot surface and a cold surface;
        an internal heat sink attached on one of the electrical components;
        blowing means for blowing cold air generated around the cold surface of the thermoelectric cooler over the internal heat sink and thereby cooling the electrical component; and
        an exhaust fan attached on the at least one panel for expelling air from the computer,
        wherein the blowing means comprises a cooling fan attached to one side of the heat sink and a fan duct between the thermoelectric cooler and the cooling fan, and wherein one end of the fan duct is fixed at the at least one panel with an intake thereof generally opposite the thermoelectric cooler and another end of the fan duct is fixed to the cooling fan.

19. A cooling system for an electrical component within an enclosure, comprising:
    a thermoelectric cooler mounted within the enclosure and electrically connected with a power source, wherein when the thermoelectric cooler is electrified the thermoelectric cooler is polarized to generate a hot surface and a cold surface;
    a partition separated from and located between the thermoelectric cooler and the electrical component for preventing cold air generated around the cold surface of the thermoelectric cooler from randomly mixing with hot air generated around the electrical component; and
    blowing means for blowing cold air generated around the cold surface of the thermoelectric cooler toward the electrical component and thereby cooling the electrical component.

* * * * *